United States Patent
Xiao et al.

(10) Patent No.: US 7,700,242 B2
(45) Date of Patent: Apr. 20, 2010

(54) TYPE OF MIXED ADDITIVES AND ELECTROLYTE FOR LITHIUM-ION SECONDARY BATTERIES USING SUCH MIXED ADDITIVES

(75) Inventors: Feng Xiao, Shenzhen (CN); Mingxia Wang, Shenzhen (CN); Guishu Zhou, Shenzhen (CN); Huaying You, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 511 days.

(21) Appl. No.: 11/583,486

(22) Filed: Oct. 18, 2006

(65) Prior Publication Data

US 2007/0105021 A1 May 10, 2007

(30) Foreign Application Priority Data

Oct. 18, 2005 (CN) .......................... 2005 1 0100488

(51) Int. Cl.
*H01M 6/18* (2006.01)
(52) U.S. Cl. ..................... 429/307; 429/326; 429/330; 429/331; 429/332; 429/333; 252/62.2; 252/364
(58) Field of Classification Search .................. 429/307, 429/326, 330, 331, 332, 333; 252/62.2, 364
See application file for complete search history.

(56) References Cited

U.S. PATENT DOCUMENTS

| 6,632,572 B1 | 10/2003 | Takahashi et al. |
| 2004/0072080 A1 | 4/2004 | Iwanaga et al. |
| 2006/0147808 A1* | 7/2006 | Xiao et al. ................. 429/330 |

FOREIGN PATENT DOCUMENTS

| CA | 2205683 | 11/1998 |
| JP | 2000156243 | 6/2000 |

* cited by examiner

*Primary Examiner*—Laura S Weiner
(74) *Attorney, Agent, or Firm*—Venture Pacific Law, PC

(57) ABSTRACT

This invention discloses a type of mixed additives for electrolyte of lithium-ion secondary batteries, having the following characteristics: in weight percentage: biphenyl series: 0.5% to 95.4%; cyclohexylbenzene series: 1.1% to 93.8%; vinylene carbonate: 0.4% to 93.2%; phenyl vinyl sulfone: 0.5% to 96.5%; ethenyl sulfonyl benzene: 0.5% to 95.8%. This invention also discloses an electrolyte for lithium-ion secondary batteries comprising organic solvents and lithium saline, wherein the special characteristic is that it comprises 2% to 20% weight percentage of said mixed additives. The distinctive advantage of the mixed additives for lithium-ion secondary batteries of this invention is to effectively enhance the overcharging, low-temperature, and cycle properties of lithium-ion batteries. A lithium-ion battery having the mixed additives of this invention remains explosion-free, ignition-free and reliably safe when the lithium-ion secondary battery is overcharging. A battery of this invention's exemplary embodiment, when discharging at temperatures of $-10°$ C. and $-20°$ C., has high capacity, high medium voltage and low terminal inner resistance.

10 Claims, 1 Drawing Sheet

TYPE OF MIXED ADDITIVES AND ELECTROLYTE FOR LITHIUM-ION SECONDARY BATTERIES USING SUCH MIXED ADDITIVES

CROSS REFERENCE

This application claims priority from a Chinese patent application entitled "A Type of Mixed Additives and Electrolyte for Lithium-Ion Secondary Batteries Using Such Mixed Additives" filed on Oct. 18, 2005, having a Chinese Application No. 200510100488.6. This application is incorporated herein by reference in its entirety.

FIELD OF INVENTION

This invention relates to a type of mixed additives used in lithium-ion batteries, the method for making the electrolyte for lithium-ion batteries having the mixed additives. In particular, it relates to a type of mixed additives and electrolyte for lithium-ion secondary batteries having the mixed additives.

BACKGROUND

Although the safety properties of current lithium-ion batteries have greatly improved, when a battery is improperly overcharged or short circuited, the improper use may still lead to accidents such as smoke, flames, or explosion, etc. Improving the property of the electrolyte is an important method of enhancing the safety properties of batteries. By adding biphenyl and cyclohexylbenzene, overcharge can be effectively curbed, thereby enhancing the safety properties. However, that will affect the cycle and low-temperature properties of batteries.

SUMMARY OF THE INVENTION

An object of this invention is to provide a type of mixed additives for lithium-ion secondary batteries in order to avoid the disadvantage of the current technology that the cycle and low-temperature properties decrease when biphenyl and cyclohexylbenzene are added.

Another object of this invention is to provide an electrolyte comprising the above mentioned mixed additives for lithium-ion secondary batteries.

Briefly, the present invention discloses a type of mixed additives for electrolyte of lithium-ion secondary batteries, comprising of the following: biphenyl series, cyclohexylbenzene series, vinylene carbonate, phenyl vinyl sulfone, and ethenyl sulfonyl benzene. In a presently preferred embodiment, the electrolyte comprises, in weight percentages, biphenyl series: 0.5% to 95.4%; cyclohexylbenzene series: 1.1% to 93.8%; vinylene carbonate: 0.4% to 93.2% phenyl vinyl sulfone: 0.5% to 96.5%; ethenyl sulfonyl benzene: 0.5% to 95.8% This invention also discloses an electrolyte for lithium-ion secondary batteries comprising organic solvents and lithium saline, wherein the special characteristic is that it comprises 2% to 20% weight percentage of said mixed additives.

The distinctive advantage of the mixed additives for lithium-ion secondary batteries of this invention is to effectively enhance the overcharging, low-temperature, and cycle properties of lithium-ion batteries. A lithium-ion battery having the mixed additives of this invention remains explosion-free, ignition-free and reliably safe when the lithium-ion secondary battery is overcharging. A battery of this invention's exemplary embodiment, when discharging at temperatures of −10° C. and −20° C., has high capacity, high medium voltage and low terminal inner resistance.

DESCRIPTION OF THE FIGURES

The following are further descriptions of the invention with references to figures and examples of their applications.

DETAILED DESCRIPTIONS OF THE PREFERRED EMBODIMENTS

Figure 1:
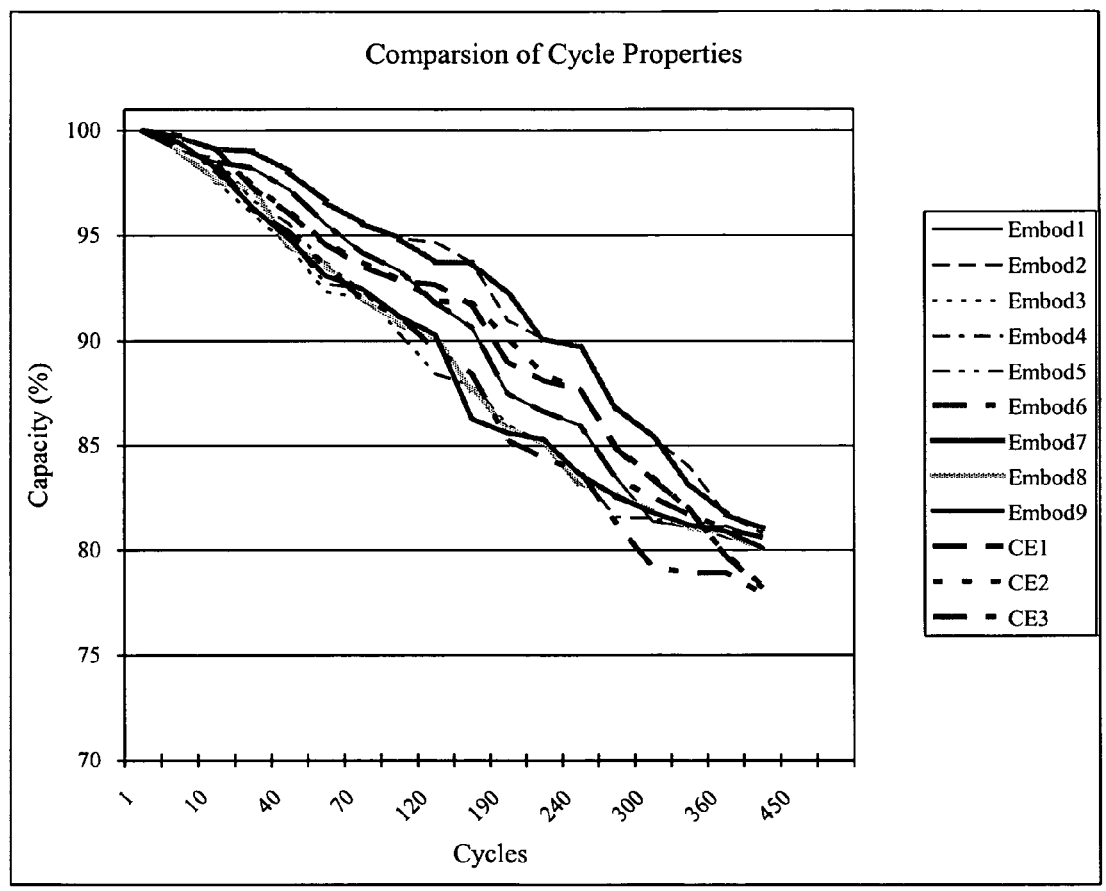
FIG. 1 is a graphical illustration of the cycling properties of the lithium-ion secondary batteries of Embodiments 1 to 9 and Comparative Examples 1 to 3.

A presently preferred embodiment of the present invention is a mixed additives for the electrolyte of lithium-ion secondary batteries, comprising biphenyl series, cyclohexylbenzene series, vinylene carbonate, phenyl vinyl sulfone, and ethenyl sulfonyl benzene; and in weight percentage: Biphenyl series: 0.5% to 95.4%; Cyclohexylbenzene series: 1.1% to 93.8%; Vinylene carbonate: 0.4% to 93.2%; Phenyl vinyl sulfone: 0.5% to 96.5%; and Ethenyl sulfonyl benzene: 0.5% to 95.8%. A series is generally known in the art as congeners of a chemical or derivatives of a chemical.

Furthermore, the biphenyl series may comprise one or a mixture of two or more of the following including biphenyl, 3-hexamethylenebiphenyl, threebiphenyl, 1,3-biphenyl cyclohexane, and their isomeric compounds.

Preferably, the biphenyl series comprises one or a mixture of two or more of the following including biphenyl, 3-hexamethylenebiphenyl, and their isomeric compounds.

Said cyclohexylbenzeneseries may comprise one or a mixture of two or more of the following including 1,3-doublecyclohexylbenzene, cyclohexylbenzene, and their isomeric compounds. Preferably, said cyclohexylbenzene series comprises cyclohexylbenzene.

Moreover, the electrolyte for lithium-ion secondary batteries produced with said mixed additives, including organic solvents and lithium saline has the special characteristic that the mixed additives being 2% to 20% in weight percentage, and the amounts of different ingredients of said additives are:

Biphenyl series: 0.5% to 95.4%;
Cyclohexylbenzene series: 1.1% to 93.8%;
Vinylene carbonate: 0.4% to 93.2%;
Phenyl vinyl sulfone: 0.5% to 96.5%; and
Ethenyl sulfonyl benzene: 0.5% to 95.8%.

After recalculation based on the above data and the total weight of the electrolyte, the electrolyte for lithium-ion secondary batteries produced with said mixed additives, including organic solvents and lithium saline, has the special characteristics that the different ingredients and the weight percentage of the mixed additives are:

Biphenyl series: 0.1% to 6.1%;
Cyclohexylbenzene series: 0.1% to 6.1%;
Vinylene carbonate: 0.1% to 4.2%;
Phenyl vinyl sulfone: 0.1% to 8.0%; and
Ethenyl sulfonyl benzene: 0.1% to 6.2%.

The other object of this invention is further achieved as follows:

Said biphenyl series comprises one or a mixture of two or more of the following including biphenyl, 3-hexamethylenebiphenyl, threebiphenyl, 1,3-biphenyl cyclohexane,and their isomeric compounds.

Preferably, said biphenyl series comprises one or a mixture of two or more of the following including biphenyl, 3-hexamethylenebiphenyl, and their isomeric compounds.

Said cyclohexylbenzene series comprises one or a mixture of two or more of the following including 1,3-doublecyclohexylbenzene, cyclohexylbenzene, and their isomeric compounds.

Preferably, said cyclohexylbenzene series comprises cyclohexylbenzene.

Said organic solvents comprise a mixture of two, three, or four of the following including dimethyl carbonate (DMC), diethyl carbonate (DEC), ethylene carbonate (EC), propylene carbonate (PC), ethyl methyl carbonate (EMC), butylene carbonate (BC), methyl ethylene carbonate (MEC), 2-methyltetrahydrofuran, butylene 1,2 carbonate, methyl propionate, methyl acetate, and tetrahydrofuran.

Said lithium saline comprises one or a mixture of two or more of the following including $LiPF_6$, $LiBF_6$, $LiAsF_6$, $LiClO_4$, $LiCF_3CO_2$, $Li(CF_3CO_2)_2N$, $LiCF_3SO_3$, $Li(CF_3SO_2)_3$, and $Li(CF_3SO_2)_2N$.

The mixed additives are added to the organic solvents. The additives can be mixed before being added or added in a random order. Then the lithium saline is dissolved in the organic solvents and the solution containing the mixed additives. The mixture is sealed and heated in 50° C. to 70° C. for 20 minutes to 30 minutes to make it rapidly dissolve, turbid or settle to obtain an electrolyte for lithium-ion secondary batteries.

Alternatively, dissolving the lithium salt in the organic solvent and adding the mixed additive, the resulting mixture is sealed and heated at a temperature between 50° C. and 70° C. for 20 to 30 minutes to make it rapidly dissolve, turbid, or settle to form an electrolyte for lithium-ion batteries. The mixed additive can be added simultaneously after mixing or be added without a specific order.

The improvement or the technological contribution of this invention is the mixed additives of this invention added to electrolytes. Therefore, in a lithium-ion secondary battery of this invention, there is no special limitation as to said positive electrode, negative electrode, separator, or the organic solvent and lithium salt in the electrolyte, etc. A person with ordinary skill in the art is free to select any available positive electrode, negative electrode, separator, or the organic solvent and lithium salt in the electrolyte, etc, based on the teachings of current technology.

When mixed additives of this invention are dissolved in the electrolyte of lithium-ion secondary batteries, they can show a higher level of stability at high temperatures, and they can consume the free radicel which cause the electrode to react with the solvents. Thereby, the additives prevent the reactions between the electrodes and the solvents at high temperatures, and curb overcharge, enhancing the usage rate of electrolytes and the cycle properties. The additives also suppress the polarization of the lithium-ion in the solid particles of the positive electrode and negative electrode materials. They can reduce the irreversible capacity of the lithiumized graphite negative electrode, and at the same time reduce the transmission impedance of the lithium-ion in the positive electrode and the negative electrode, improving the electrochemical properties of the carbon negative electrode. The additives can eliminate the occurrence of the battery prematurely reaching the terminal voltage when discharging at a low temperature, therefore improving the battery's low-temperature properties. More importantly, mixed additives of this invention can easily polyreact to form a thin layer of electrically insulating superpolymer, covering the surface of the positive electrode or further blocking the separator. Consequently, the additives have a distinctive characteristic of improving the battery reliability, safety, explosion-free, and ignition-free when the lithium-ion secondary battery is overcharged. The additives allow the batteries to avoid disadvantages such as worsened cycle and low-temperature properties when overcharge additives including biphenyl series, cyclohexylbenzene series, and their isomeric compounds are added, thereby enhancing the battery's overall properties with respect to properties such as cycle and low-temperature properties.

The distinctive advantage of the mixed additives for lithium-ion secondary batteries of this invention is to effectively enhance the overcharge, low-temperature, and cycle properties of lithium-ion batteries. A lithium-ion battery having the mixed additives of this invention remains explosion-free, ignition-free and reliably safe when the lithium-ion secondary battery is overcharged. When discharging at temperatures of –10° C. and –20° C., a battery of this invention's exemplary embodiment has a higher capacity, lowered pressure, extended cycling properties, high medium voltage, and low terminal internal resistance.

EMBODIMENTS

The following embodiments further illustrate this invention. However, they are not to be understood as the limitations of the scope of protection for this invention. Through these specific embodiments, a person of ordinary skill in the art can better understand the advantages of the mixed additives of this invention.

Embodiment 1

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1.0 mol/L; adding the mixed additives into the solution which is heated at 50° C. until the additives dissolve to form the electrolyte of this invention. The amount of each ingredient of the mixed additives in weight percentage of the electrolyte respectively is: 3-hexamethylenebiphenyl (0.1 wt. %), cyclohexylbenzene (2.0 wt. %), vinylene carbonate (1.0 wt. %), phenyl vinyl sulfone (0.1 wt. %), ethenyl sulfonyl benzene (0.1 wt. %). The mixed additive is 3.3 wt. % of the total weight of the electrolyte.

The battery can be manufactured as follows: injecting the electrolyte above into the battery shell; and sealing the shell to make the Model 453450A lithium-ion secondary battery.

Embodiment 2

The electrolyte can be produced as follows: mixing ethylene carbonate and diethyl carbonate at a ratio of 1:1; adding $LiPF_6$ as the electrolyte solid to form an electrolyte solution with a concentration of 1.0 mol/L; adding the mixed additives into the solution which is heated at 60° C. until the additives dissolve to form the electrolyte of this invention. The amount of each ingredient of the mixed additives in weight percentage of the electrolyte respectively is: 3-hexamethylenebiphenyl (4.0 wt. %), cyclohexylbenzene (0.1 wt. %), vinylene carbonate (4.0 wt. %), phenyl vinyl sulfone (2.0 wt. %), ethenyl sulfonyl benzene (6.0 wt. %). The mixed additive is 16.1 wt. % of the total weight of the electrolyte.

Manufacturing of the battery: same as in Embodiment 1.

Embodiment 3

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1.0 mol/L; adding the mixed additives into the solution which is heated at 70° C. until the additives dissolve to form the electrolyte of this invention. The amount of each ingredient of the mixed additives in weight percentage of the electrolyte respectively is: biphenyl (2.0 wt. %), cyclohexylbenzene (3.0 wt. %), vinylene carbonate (1.5 wt. %), phenyl vinyl sulfone (2.0 wt. %), ethenyl sulfonyl benzene (1.2 wt. %). The mixed additive is 9.7 wt. % of the total weight of the electrolyte.

Manufacturing of the battery: same as in Embodiment 1.

Embodiment 4

The electrolyte can be produced as follows: mixing ethylene carbonate and diethyl carbonate at a ratio of 1:1; adding $LiPF_6$ as the electrolyte solid to form an electrolyte solution with a concentration of 1.0 mol/L; adding the mixed additives into the solution which is heated at 60° C. until the additives dissolve to form the electrolyte of this invention. The amount of each ingredient of the mixed additives in weight percentage of the electrolyte respectively is: threebiphenyl (3.3 wt. %), 1,3-doublecyclohexylbenzene (2.5 wt. %), vinylene carbonate (2.1 wt. %), phenyl vinyl sulfone (2.1 wt. %), ethenyl sulfonyl benzene (1.8 wt. %). The mixed additive is 11.8 wt. % of the total weight of the electrolyte.

Manufacturing of the battery: same as in Embodiment 1.

Embodiment 5

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1.0 mol/L; adding the mixed additives into the solution which is heated at 70° C. until the additives dissolve to form the electrolyte of this invention. The amount of each ingredient of the mixed additives in weight percentage of the electrolyte respectively is: threebiphenyl (1.2 wt. %), 1,3-doublecyclohexylbenzene (5.0 wt. %), vinylene carbonate (1.0 wt. %), phenyl vinyl sulfone (1.9 wt. %), ethenyl sulfonyl benzene (2.3 wt. %). The mixed additive is 11.4 wt. % of the total weight of the electrolyte.

Manufacturing of the battery: same as in Embodiment 1.

Embodiment 6

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1.0 mol/L; adding the mixed additives into the solution which is heated at 70° C. until the additives dissolve to form the electrolyte of this invention. The amount of each ingredient of the mixed additives in weight percentage of the electrolyte respectively is: biphenyl (6.0 wt. %), cyclohexylbenzene (1.0 wt. %), vinylene carbonate (2.5 wt. %), phenyl vinyl sulfone (3.0 wt. %), ethenyl sulfonyl benzene (3.0 wt. %). The mixed additive is 15.5 wt. % of the total weight of the electrolyte.

Manufacturing of the battery: same as in Embodiment 1.

Embodiment 7

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1.0 mol/L; adding the mixed additives into the solution which is heated at 50° C. until the additives dissolve to form the electrolyte of this invention. The amount of each ingredient of the mixed additives in weight percentage of the electrolyte respectively is: biphenyl (1.0 wt. %), cyclohexylbenzene (6.0 wt. %), vinylene carbonate (2.0 wt. %), phenyl vinyl sulfone (2.5 wt. %), ethenyl sulfonyl benzene (1.5 wt. %). The mixed additive is 13.0 wt. % of the total weight of the electrolyte.

Manufacturing of the battery: same as in Embodiment 1.

Embodiment 8

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 11.0 mol/L; adding the mixed additives into the solution which is heated at 70° C. until the additives dissolve to form the electrolyte of this invention. The amount of each ingredient of the mixed additives in weight percentage of the electrolyte respectively is: biphenyl (1.5 wt. %), cyclohexylbenzene (4.0 wt. %), vinylene carbonate (2.7 wt. %), phenyl vinyl sulfone (7.5 wt. %), ethenyl sulfonyl benzene (3.2 wt. %). The mixed additive is 18.9 wt. % of the total weight of the electrolyte.

Manufacturing of the battery: same as in Embodiment 1.

Embodiment 9

The electrolyte can be produced as follows: mixing ethylene carbonate and diethyl carbonate at a ratio of 1:1; adding $LiPF_6$ as the electrolyte solid to form an electrolyte solution with a concentration of 0.9 mol/L; adding the mixed additives into the solution which is heated at 50° C. until the additives dissolve to form the electrolyte of this invention. The amount of each ingredient of the mixed additives in weight percentage of the electrolyte respectively is: biphenyl (2.0 wt. %), cyclohexylbenzene (5.5 wt. %), vinylene carbonate (3.3 wt. %), phenyl vinyl sulfone (2.5 wt. %), ethenyl sulfonyl benzene (2.5 wt. %). The mixed additive is 15.8 wt. % of the total weight of the electrolyte.

Manufacturing of the battery: same as in Embodiment 1.

COMPARATIVE EXAMPLE 1

The electrolyte can be produced as follows: mixing ethylene carbonate, ethyl methyl carbonate, and dimethyl carbonate at a ratio of 1:1:1; adding $LiPF_6$ as the electrolyte solid to form an electrolyte solution with a concentration of 1 mol/L.

Manufacturing of the battery: same as in Embodiment 1.

COMPARATIVE EXAMPLE 2

The electrolyte can be produced as follows: mixing ethylene carbonate and diethyl carbonate at a ratio of 1:1; adding $LiPF_6$ as the electrolyte solid to form an electrolyte solution with a concentration of 0.9 mol/L.

Manufacturing of the battery: same as in Embodiment 1.

COMPARATIVE EXAMPLE 3

The electrolyte can be produced as follows: mixing ethylene carbonate, ethyl methyl carbonate, and dimethyl carbonateare at a ratio of 1:1:1; adding $LiPF_6$ as the electrolyte solid to form an electrolyte solution with a concentration of 1 mol/L; adding overcharge-type additives into the solution which is heated at 50° C. until the additives dissolve to form the electrolyte of this comparative example. The amount of each ingredient of the mixed additives in weight percentage of the electrolyte respectively is: biphenyl (2.0 wt. %), cyclohexylbenzene (3.0 wt. %). The mixed additive is 5.0 wt. % of the total weight of the electrolyte.

Manufacturing of the battery: same as in Embodiment 1.

The overcharge properties of the lithium ion secondary batteries of embodiments 1 through 9 and Comparison Examples 1 through 3 are tested and the results are shown in Table 1. The testing method for each battery includes the following steps: discharging at 1C constant current to 3.0V; using a universal meter to adjust the output current of a constant current and constant voltage power supply to that as required by the overcharging test; adjusting the output voltage to about 1V higher than the required overcharge voltage limit; attaching with heat-resistant tape the temperature sensor of a thermocouple sensor to the middle of the battery's side; covering the surface of the battery with a layer of asbestos material having a thickness of 12 mm when the asbestos is loose; adjusting the speed of the moving paper to 6 cm/h or 20 cm/h and setting a suitable magnification rate of a three-pen note apparatus; turning on the constant current and constant voltage power supply to overcharge said battery; recording the change in the battery's temperature, voltage, electrical current; observing and noting any leakage, breach, fume, explosion, or ignition; recording the battery's charging time at constant current, the battery's highest temperature, and the time it reaches the highest temperature. This test is terminated when any of the following conditions occurs: the battery's surface temperature rises above 200° C.; the battery explodes; the battery is on fire; the overcharging electrical current drops below 50 mA; the battery's voltage reaches the specified voltage and its surface temperature drops below 35° C.

TABLE 1

| | 1 C, 12 V Overcharge | | | 1 C, 18.5 V Overcharge | | |
|---|---|---|---|---|---|---|
| | Phenomenon | Longest time (min) | Highest Temperature (° C.) | Phenomenon | Longest time (min) | Highest Temperature (° C.) |
| Embodiment 1 | No explosion or ignition | 125 | 155 | No explosion or ignition | 100 | 158 |
| Embodiment 2 | No explosion or ignition | 150 | 146 | No explosion or ignition | 150 | 139 |
| Embodiment 3 | No explosion or ignition | 150 | 119 | No explosion or ignition | 150 | 130 |
| Embodiment 4 | No explosion or ignition | 150 | 118 | No explosion or ignition | 150 | 128 |
| Embodiment 5 | No explosion or ignition | 150 | 111 | No explosion or ignition | 150 | 127 |
| Embodiment 6 | No explosion or ignition | 150 | 109 | No explosion or ignition | 150 | 122 |
| Embodiment 7 | No explosion or ignition | 150 | 154 | No explosion or ignition | 150 | 156 |
| Embodiment 8 | No explosion or ignition | 150 | 118 | No explosion or ignition | 150 | 128 |
| Embodiment 9 | No explosion or ignition | 150 | 116 | No explosion or ignition | 150 | 118 |
| Comparative Example 1 | Explosion | 91 | 328 | Explosion | 96 | 338 |
| Comparative Example 2 | Explosion | 92 | 337 | Explosion | 95 | 342 |
| Comparative Example 3 | No explosion or ignition | 150 | 132 | No explosion or ignition | 120 | 132 |

As shown in Table 2, the batteries of the embodiments of this invention have very good overcharging properties. They show distinct improvement over the batteries of the comparative examples. Although the overcharging properties of Comparative Example 3 are also good, its low-temperature and cycle properties have disadvantages as shown in the following table. That reflects the advantage of the mixed additives of this invention which means better overcharging properties as well as distinctively improved and enhanced low-temperature and cycle properties.

The lithium-ion secondary batteries of Embodiments 1~9 and Comparative Examples 1~2 are tested for low-temperature properties. The results are listed in Table 2.

The method for the testing of each battery includes the following steps: charging a battery to 4.2V with 1 CmA constant current and voltage; discharging the battery to 3.0V at 1 CmA—the discharge capacity is the initial capacity; charging the battery to 4.2V at 1 CmA constant current and voltage; discharging the battery at 1 CmA at a temperature of −10° C.; and recording the capacity and the terminal internal resistance when the battery is discharged to 3.1V, 3.0V, and 2.75V.

TABLE 2

−10° C., 1 C Discharge

|  | 3.1 V/Initial capacity (%) | 3.0 V/ Initial capacity (%)) | 2.75 V/ Initial capacity (%) | Medium voltage (V) | Terminal inner resistance (mΩ) |
| --- | --- | --- | --- | --- | --- |
| Embodiment 1 | 43.8 | 47.5 | 49.8 | 3.316 | 48.5 |
| Embodiment 2 | 47.9 | 49.8 | 53.8 | 3.317 | 41.9 |
| Embodiment 3 | 43.9 | 47.7 | 49.9 | 3.315 | 47.5 |
| Embodiment 4 | 42.8 | 47.3 | 48.5 | 3.315 | 49.5 |
| Embodiment 5 | 40.9 | 44.1 | 46.8 | 3.315 | 50.1 |
| Embodiment 6 | 41.2 | 44.3 | 46.9 | 3.314 | 50.9 |
| Embodiment 7 | 44.9 | 46.2 | 48.6 | 3.316 | 50.8 |
| Embodiment 8 | 44.2 | 48.2 | 50.3 | 3.316 | 48.2 |
| Embodiment 9 | 42.6 | 44.7 | 48.2 | 3.318 | 50.1 |
| Comparative Example 1 | 33.8 | 38.2 | 43.9 | 3.309 | 53.1 |
| Comparative Example 2 | 33.7 | 37.0 | 43.6 | 3.308 | 53.5 |
| Comparative Example 3 | 30.7 | 34.2 | 40.6 | 3.302 | 54.5 |

The lithium-ion secondary batteries of Embodiments 1~9 and Comparative Examples 1~2 are tested for low-temperature properties. The results are listed in Table 3.

The method for the testing of each battery includes the following steps: charging a battery to 4.2V at 1 CmA constant current and voltage; discharging the battery to 3.0V at 1 CmA—the discharge capacity is the initial capacity; charging the battery to 4.2V at 1 CmA constant current and voltage; discharging the battery at 1 CmA at a temperature of −20° C.; and recording the capacity and the terminal inner resistance when the battery is discharged to 3.1V, 3.0V, and 2.75V.

TABLE 3

−20° C., 1 C Discharge

|  | 3.1 V/Initial capacity (%) | 3.0 V/ Initial capacity (%)) | 2.75 V/ Initial capacity (%) | Initial capacity (V) | Ending inner resistance (mΩ) |
| --- | --- | --- | --- | --- | --- |
| Embodiment 1 | 28.8 | 31.7 | 40.9 | 3.108 | 53.9 |
| Embodiment 2 | 32.4 | 35.7 | 42.9 | 3.118 | 54.6 |
| Embodiment 3 | 31.9 | 36.4 | 43.8 | 3.113 | 54.8 |
| Embodiment 4 | 30.7 | 33.7 | 41.6 | 3.108 | 53.5 |
| Embodiment 5 | 28.7 | 31.6 | 40.9 | 3.107 | 53.9 |
| Embodiment 6 | 29.7 | 31.7 | 36.5 | 3.105 | 56.8 |
| Embodiment 7 | 28.9 | 29.1 | 41.2 | 3.104 | 56.8 |
| Embodiment 8 | 32.2 | 36.8 | 44.0 | 3.113 | 55.6 |
| Embodiment 9 | 28.6 | 29.6 | 40.8 | 3.107 | 56.1 |
| Comparative Example 1 | 22.6 | 28.4 | 39 | 3.1 | 57.8 |
| Comparative Example 2 | 22.2 | 23.7 | 34.9 | 3.099 | 58.2 |
| Comparative Example 3 | 20.2 | 21.8 | 31.4 | 3.085 | 60.8 |

As shown in Table 2 and Table 3, a battery of the embodiments of this invention has distinct improvements in low-temperature properties over the batteries of the comparative examples. A battery of this invention's has high capacity when discharging at temperatures of −10° C. and −20° C. The battery also has a high medium voltage when it is discharging. In addition, the ending inner resistance is low when the battery is discharging in low temperatures.

The lithium-ion secondary batteries of Embodiments 1~9 and Comparative Examples 1~3 are tested for cycle properties. The results are shown in FIG. 1 and Table 4. The method for the testing of each battery includes the following steps: properly putting a battery on a BS-9300 property tester; charging the battery to 4.2V at 1 CmA constant current and voltage; putting the battery aside for 5 minutes; discharging the battery to 3.0V at 1 CmA; repeating the above steps until the capacity residue rate reaches 80%; recording the capacity, discharge state inner resistance, and medium voltage of each cycle. At the end of a cycle, as the battery regains its regular temperature, fully charging the battery at 1C; discharging the battery at 0.2C to 3.0V; printing the comparative tables showing discharge curves and capacity residue rates. In addition, the thickness of the battery is tested after 100, 200, 300, and 400 cycles. Here, the thickness of the upper part is that of 4 mm from the top of the battery, the thickness of the middle part is that of the very center of the battery, and the thickness of the lower part is that of 4 mm from the bottom of the battery.

TABLE 4

Cycle Thickness

|  | Location of the Tested Thickness of the Battery | Initial Thickness (mm) | Thickness after 100 Cycles (mm) | Difference in Thickness (Initial Thickness and after 100 Cycles) | Thickness after 200 Cycles (mm) | Difference in Thickness (Initial Thickness and after 200 Cycles) | Thickness after 300 Cycles (mm) | Difference in Thickness (Initial Thickness and after 300 Cycles) | Thickness after 400 Cycles (mm) | Difference in Thickness (Initial Thickness and after 400 Cycles) |
| --- | --- | --- | --- | --- | --- | --- | --- | --- | --- | --- |
| Embodiment 1 | Upper | 4.52 | 4.57 | 0.05 | 4.69 | 0.17 | 4.85 | 0.33 | 4.92 | 0.40 |
|  | Mid. | 4.49 | 4.55 | 0.06 | 4.74 | 0.25 | 4.88 | 0.39 | 4.99 | 0.50 |
|  | Lower | 4.55 | 4.68 | 0.13 | 4.73 | 0.18 | 4.85 | 0.30 | 4.93 | 0.38 |
| Embodiment 2 | Upper | 4.53 | 4.66 | 0.13 | 4.72 | 0.19 | 4.85 | 0.32 | 4.92 | 0.39 |
|  | Mid. | 4.48 | 4.69 | 0.22 | 4.85 | 0.37 | 4.92 | 0.44 | 5.02 | 0.55 |
|  | Lower | 4.66 | 4.74 | 0.08 | 4.82 | 0.16 | 4.85 | 0.19 | 4.94 | 0.28 |

TABLE 4-continued

<table>
<tr><th></th><th>Location of the Tested Thickness of the Battery</th><th>Initial Thickness (mm)</th><th colspan="2">Cycle Thickness</th><th colspan="2"></th><th colspan="2"></th><th colspan="2"></th></tr>
<tr><th></th><th></th><th></th><th>Thickness after 100 Cycles (mm)</th><th>Difference in Thickness (Initial Thickness and after 100 Cycles)</th><th>Thickness after 200 Cycles (mm)</th><th>Difference in Thickness (Initial Thickness and after 200 Cycles)</th><th>Thickness after 300 Cycles (mm)</th><th>Difference in Thickness (Initial Thickness and after 300 Cycles)</th><th>Thickness after 400 Cycles (mm)</th><th>Difference in Thickness (Initial Thickness and after 400 Cycles)</th></tr>
<tr><td>Embodiment 3</td><td>Upper</td><td>4.51</td><td>4.55</td><td>0.04</td><td>4.70</td><td>0.19</td><td>4.83</td><td>0.32</td><td>4.90</td><td>0.39</td></tr>
<tr><td></td><td>Mid.</td><td>4.48</td><td>4.53</td><td>0.05</td><td>4.75</td><td>0.27</td><td>4.86</td><td>0.38</td><td>4.97</td><td>0.49</td></tr>
<tr><td></td><td>Lower</td><td>4.54</td><td>4.66</td><td>0.12</td><td>4.74</td><td>0.20</td><td>4.83</td><td>0.29</td><td>4.91</td><td>0.37</td></tr>
<tr><td>Embodiment 4</td><td>Upper</td><td>4.52</td><td>4.64</td><td>0.12</td><td>4.73</td><td>0.21</td><td>4.83</td><td>0.31</td><td>4.90</td><td>0.38</td></tr>
<tr><td></td><td>Mid.</td><td>4.47</td><td>4.67</td><td>0.21</td><td>4.86</td><td>0.39</td><td>4.90</td><td>0.43</td><td>5.00</td><td>0.54</td></tr>
<tr><td></td><td>Lower</td><td>4.55</td><td>4.72</td><td>0.17</td><td>4.83</td><td>0.28</td><td>4.83</td><td>0.28</td><td>4.92</td><td>0.37</td></tr>
<tr><td>Embodiment 5</td><td>Upper</td><td>4.53</td><td>4.54</td><td>0.01</td><td>4.66</td><td>0.13</td><td>4.81</td><td>0.28</td><td>4.87</td><td>0.34</td></tr>
<tr><td></td><td>Mid.</td><td>4.50</td><td>4.52</td><td>0.02</td><td>4.71</td><td>0.21</td><td>4.84</td><td>0.34</td><td>4.94</td><td>0.44</td></tr>
<tr><td></td><td>Lower</td><td>4.56</td><td>4.65</td><td>0.09</td><td>4.70</td><td>0.14</td><td>4.81</td><td>0.25</td><td>4.88</td><td>0.32</td></tr>
<tr><td>Embodiment 6</td><td>Upper</td><td>4.54</td><td>4.63</td><td>0.09</td><td>4.69</td><td>0.15</td><td>4.81</td><td>0.27</td><td>4.87</td><td>0.33</td></tr>
<tr><td></td><td>Mid.</td><td>4.49</td><td>4.66</td><td>0.18</td><td>4.82</td><td>0.33</td><td>4.88</td><td>0.39</td><td>4.97</td><td>0.49</td></tr>
<tr><td></td><td>Lower</td><td>4.57</td><td>4.71</td><td>0.14</td><td>4.79</td><td>0.22</td><td>4.81</td><td>0.24</td><td>4.89</td><td>0.32</td></tr>
<tr><td>Embodiment 7</td><td>Upper</td><td>4.51</td><td>4.68</td><td>0.16</td><td>4.74</td><td>0.23</td><td>4.86</td><td>0.35</td><td>4.93</td><td>0.42</td></tr>
<tr><td></td><td>Mid.</td><td>4.46</td><td>4.71</td><td>0.25</td><td>4.87</td><td>0.41</td><td>4.93</td><td>0.48</td><td>5.03</td><td>0.58</td></tr>
<tr><td></td><td>Lower</td><td>4.64</td><td>4.76</td><td>0.12</td><td>4.84</td><td>0.20</td><td>4.87</td><td>0.23</td><td>4.95</td><td>0.31</td></tr>
<tr><td>Embodiment 8</td><td>Upper</td><td>4.50</td><td>4.66</td><td>0.16</td><td>4.75</td><td>0.25</td><td>4.84</td><td>0.34</td><td>4.91</td><td>0.41</td></tr>
<tr><td></td><td>Mid.</td><td>4.45</td><td>4.69</td><td>0.24</td><td>4.88</td><td>0.43</td><td>4.91</td><td>0.47</td><td>5.01</td><td>0.57</td></tr>
<tr><td></td><td>Lower</td><td>4.53</td><td>4.74</td><td>0.21</td><td>4.85</td><td>0.32</td><td>4.85</td><td>0.32</td><td>4.93</td><td>0.40</td></tr>
<tr><td>Embodiment 9</td><td>Upper</td><td>4.52</td><td>4.65</td><td>0.13</td><td>4.71</td><td>0.19</td><td>4.82</td><td>0.30</td><td>4.88</td><td>0.36</td></tr>
<tr><td></td><td>Mid.</td><td>4.47</td><td>4.68</td><td>0.21</td><td>4.84</td><td>0.37</td><td>4.89</td><td>0.43</td><td>4.98</td><td>0.52</td></tr>
<tr><td></td><td>Lower</td><td>4.55</td><td>4.73</td><td>0.18</td><td>4.81</td><td>0.26</td><td>4.83</td><td>0.28</td><td>4.90</td><td>0.35</td></tr>
<tr><td>Comparative Example 1</td><td>Upper</td><td>4.62</td><td>4.76</td><td>0.14</td><td>5.08</td><td>0.46</td><td>5.16</td><td>0.54</td><td>5.17</td><td>0.55</td></tr>
<tr><td></td><td>Mid.</td><td>4.59</td><td>4.74</td><td>0.15</td><td>5.13</td><td>0.54</td><td>5.19</td><td>0.60</td><td>5.24</td><td>0.65</td></tr>
<tr><td></td><td>Lower</td><td>4.65</td><td>4.87</td><td>0.22</td><td>5.12</td><td>0.47</td><td>5.16</td><td>0.51</td><td>5.18</td><td>0.53</td></tr>
<tr><td>Comparative Example 2</td><td>Upper</td><td>4.54</td><td>4.77</td><td>0.24</td><td>4.88</td><td>0.34</td><td>4.97</td><td>0.44</td><td>5.16</td><td>0.63</td></tr>
<tr><td></td><td>Mid.</td><td>4.48</td><td>4.77</td><td>0.29</td><td>4.88</td><td>0.40</td><td>5.04</td><td>0.56</td><td>5.23</td><td>0.75</td></tr>
<tr><td></td><td>Lower</td><td>4.60</td><td>4.88</td><td>0.28</td><td>4.95</td><td>0.35</td><td>5.10</td><td>0.50</td><td>5.17</td><td>0.57</td></tr>
<tr><td>Comparative Example 3</td><td>Upper</td><td>4.63</td><td>4.85</td><td>0.22</td><td>5.11</td><td>0.48</td><td>5.16</td><td>0.53</td><td>5.17</td><td>0.54</td></tr>
<tr><td></td><td>Mid.</td><td>4.58</td><td>4.88</td><td>0.31</td><td>5.24</td><td>0.66</td><td>5.23</td><td>0.65</td><td>5.27</td><td>0.70</td></tr>
<tr><td></td><td>Lower</td><td>4.66</td><td>4.93</td><td>0.27</td><td>5.21</td><td>0.55</td><td>5.16</td><td>0.50</td><td>5.19</td><td>0.53</td></tr>
</table>

As shown in FIG. 1 and Table 4, compared to the batteries of the comparative examples, the cycle properties of the batteries of the embodiments of this invention show distinctive improvements. The batteries of the embodiments of this invention have high cycle capacity residue rate, and little expansion in thickness after cycles.

The batteries having the electrolytes of embodiment 1~9 have good overcharging properties. In the event of overcharging, the batteries remain explosion-free and ignition-free and have good cycle and low-temperature discharging properties, as shown in Table 1~Table 4 and FIG. 1.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. An additive for electrolytes of lithium-ion secondary batteries comprising biphenyl series, cyclohexylbenzene series, vinylene carbonate, phenyl vinyl sulfone, and ethenyl sulfonyl benzene.

2. The additive of claim 1 wherein, in weight percentage, comprising:

biphenyl series: 0.5% to 95.4%;

cyclohexylbenzene series: 0.1% to 93.8%;

vinylene carbonate: 0.4% to 93.2%;

phenyl vinyl sulfone: 0.5% to 96.5%; and ethenyl sulfonyl benzene: 0.5% to 95.8%.

3. The additive of claim 2 wherein, said biphenyl series comprises one or more of the following: biphenyl, 3-hexamethylenebiphenyl, terphenyl, 1,3-biphenyl cyclohexane, and their isomeric compounds.

4. The additive of claim 2 wherein, said biphenyl series comprises one or more of the following: biphenyl, 3-hexamethylenebiphenyl, and their isomeric compounds.

5. The additive of claim 4 wherein said cyclohexylbenzene series comprises one or more of the following: 1,3-bicyclohexylbenzene, cyclohexylbenzene, and their isomeric compounds.

6. The additive of claim 4 wherein said cyclohexylbenzene series comprises cyclohexylbenzene.

7. The additive of claim 1 wherein, said biphenyl series comprises one or more of the following: biphenyl, 3-hexamethylenebiphenyl, terphenyl, 1,3-biphenyl cyclohexane, and their isomeric compounds.

8. The additive of claim 1 wherein, said biphenyl series comprises one or more of the following: biphenyl, 3-hexamethylenebiphenyl, and their isomeric compounds.

9. The additive of claim 8 wherein said cyclohexylbenzene series comprises one or more of the following: 1,3-bicyclohexylbenzene, cyclohexylbenzene, and their isomeric compounds.

10. The additive of claim 8 wherein said cyclohexylbenzene series comprises cyclohexylbenzene.

* * * * *